United States Patent
Fredrickson et al.

(10) Patent No.: US 9,501,439 B1
(45) Date of Patent: Nov. 22, 2016

(54) COMMUNICATING IN AN INTEGRATED CIRCUIT USING HARDWARE-MANAGED VIRTUAL CHANNELS

(71) Applicant: International Business Machines Corporation, Armonk, NY (US)

(72) Inventors: Mark S. Fredrickson, Rochester, MN (US); Scott M. Willenborg, Stewartville, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/000,895

(22) Filed: Jan. 19, 2016

(51) Int. Cl.
*G06F 9/34* (2006.01)
*G06F 13/362* (2006.01)
*G06F 13/40* (2006.01)

(52) U.S. Cl.
CPC ......... *G06F 13/362* (2013.01); *G06F 13/4068* (2013.01)

(58) Field of Classification Search
USPC .................................. 710/113; 711/203–209
See application file for complete search history.

(56) References Cited

U.S. PATENT DOCUMENTS

| | | | | |
|---|---|---|---|---|
| 4,633,392 A * | 12/1986 | Vincent | ................. | G06F 15/161 710/104 |
| 5,819,036 A * | 10/1998 | Adams | ................ | H04L 12/2801 709/203 |
| 6,253,224 B1 * | 6/2001 | Brice, Jr. | ............ | G06F 9/45558 711/208 |
| 6,304,894 B1 * | 10/2001 | Nakayama | .............. | H04L 67/42 709/202 |
| 6,968,389 B1 * | 11/2005 | Menditto | .......... | H04L 29/12066 709/219 |
| 7,913,010 B2 | 3/2011 | Hoover et al. | | |
| 8,417,778 B2 | 4/2013 | Arimilli et al. | | |
| 9,137,165 B2 * | 9/2015 | Anand | | |
| 2002/0099967 A1 * | 7/2002 | Kawaguchi | ........... | G06F 1/3203 713/323 |
| 2002/0181445 A1 * | 12/2002 | Beer | ................... | H04L 12/2803 370/352 |
| 2003/0131141 A1 * | 7/2003 | Springmeyer | ............ | G06F 8/38 719/310 |

(Continued)

FOREIGN PATENT DOCUMENTS

| | | |
|---|---|---|
| CN | 102629913 | 12/2014 |
| JP | 410145382 A | 5/1998 |

OTHER PUBLICATIONS

Salamon, Wayne, How to Configure Linux for ATM Networks, High Performance Systems and Services Division, Jun. 29, 1998, 12 pages, National Institute of Standards and Technology, Gaithersburg, United States.

(Continued)

*Primary Examiner* — Paul R Myers
(74) *Attorney, Agent, or Firm* — Patterson + Sheridan, LLP (57) ABSTRACT

Embodiments herein describe a switchboard coupled to a system bus in an integrated circuit for managing the flow of data between different entities coupled to the bus (e.g., processing cores, accelerators, memory controllers, input/output (I/O) interfaces, and the like). The switchboard is a hardware module that may be tasked with assigning different system bus addresses (or range of addresses) to each of the entities coupled to the bus. These addresses may be unique such that each entity can be uniquely identified by its assigned address. The address space of the system bus also includes managed address that are reserved—i.e., are not assigned to any particular entity. The switchboard is tasked with assigning the managed addresses (also referred to as virtual channels) to an entity which can be used to enable direct communication between hardware entities using the system bus.

18 Claims, 4 Drawing Sheets

(56) References Cited

U.S. PATENT DOCUMENTS

| | | | | |
|---|---|---|---|---|
| 2003/0179759 A1* | 9/2003 | Wang | ................ | H04L 12/5601 370/399 |
| 2004/0073549 A1* | 4/2004 | Turkel | ................ | G06F 17/3046 |
| 2006/0200444 A1* | 9/2006 | Bracho | ................ | G06F 9/542 |
| 2008/0027827 A1* | 1/2008 | Eglen | ................ | G06Q 30/00 705/26.8 |
| 2009/0085631 A1* | 4/2009 | Lambrecht | ......... | G06F 13/4291 327/299 |
| 2011/0153716 A1* | 6/2011 | Malakapalli | ......... | G06F 9/4445 709/203 |
| 2011/0283366 A1* | 11/2011 | Kwon | ................ | G06F 21/54 726/29 |
| 2014/0365670 A1* | 12/2014 | Wang | ................ | H04W 76/02 709/227 |
| 2015/0025869 A1* | 1/2015 | Johnsen | ................ | G01V 1/282 703/10 |
| 2015/0052281 A1* | 2/2015 | Hart | ................ | G06F 13/16 710/308 |

OTHER PUBLICATIONS

IBM et al., Virtual Address Monitoring Technique, ip.com, Mar. 4, 2005, 3 pages, Fairport, United States.

IBM et al., Snoop Mechanism to Monitor Computer Bus, ip.com, Mar. 15, 2005, 3 pages, Fairport, United States.

\* cited by examiner

COMMUNICATING IN AN INTEGRATED CIRCUIT USING HARDWARE-MANAGED VIRTUAL CHANNELS

BACKGROUND

The present invention relates to communication between hardware entities in an integrated circuit, and more specifically, to assigning and monitoring managed addresses assigned to a system bus in the integrated circuit.

Processors may include multiple cores that are used to perform instructions. These cores may be interconnected within the processor using a system bus (also referred to as a processor bus). In some processors, the system bus communicatively couples the cores to one or more accelerators in the processor which perform specialized tasks such as data compression or encoding/decoding of information (i.e., cryptography). Managing the flow of data between the cores and the accelerators via the system bus is an important performance metric of the processor.

SUMMARY

One embodiment of the present invention is an integrated circuit that includes a system bus configured to broadcast data to each entity coupled to the system bus, an accelerator coupled to the system bus, a hardware entity coupled to the system bus, and a bus manager coupled to the system bus. The bus manager is configured to assign a managed address to the accelerator based on a characteristic of the accelerator, where the managed address is a reserved address in an address space of the system bus. The bus manager is configured to receive a request from the hardware entity via the system bus to perform a task using the accelerator and provide the managed address to the hardware entity via the system bus, where the managed address enables the hardware entity to communicate directly with the accelerator using the system bus.

Another embodiment of the present invention is a processor that includes a processor bus configured to broadcast data to each entity coupled to the processor bus, an accelerator coupled to the processor bus, a plurality of processing cores coupled to the processor bus, and a bus manager coupled to the processor bus. The bus manager is configured to assign a managed address to the accelerator based on a characteristic of the accelerator where the managed address is a reserved address in an address space of the processor bus. The bus manager is configured to receive a request from one of the processing cores via the system bus to perform a task using the accelerator and provide the managed address to the one processing core via the system bus where the managed address enables the one processing core to communicate directly with the accelerator using the system bus.

Another embodiment of the present invention is a method that includes assigning, using a bus manager coupled to a system bus, a managed address to an accelerator coupled to the system bus based on a characteristic of the accelerator where the managed address is a reserved address in an address space of the system bus. The method includes receiving a request from a hardware entity coupled to the system bus to perform a task using the accelerator and providing the managed address to the hardware entity via the system bus where the managed address enables the hardware entity to communicate directly with the accelerator using the system bus. Moreover, the bus manager, system bus, accelerator, and hardware entity are embodied within a common integrated circuit.

BRIEF DESCRIPTION OF THE SEVERAL VIEWS OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments herein describe a switchboard coupled to a system bus in an integrated circuit for managing the flow of data between different hardware entities coupled to the bus (e.g., processing cores, accelerators, memory controllers, input/output (I/O) interfaces, and the like). The switchboard is a hardware module that may be tasked with assigning a different system bus address (or a range of addresses) to each of the entities coupled to the bus. These addresses may be unique such that each entity can be uniquely identified by its assigned address. The entities monitor the system bus for data that has their corresponding address, thereby indicating to the entity that it is the intended destination for the data.

In one embodiment, the address space of the system bus includes managed addresses that are reserved—i.e., are not assigned exclusively to any particular entity. The switchboard is tasked with assigning the managed addresses (also referred to as virtual channels) to an entity which can be used to enable direct communication to that entity using the system bus. For example, without managed addresses, when a core wants to send data to an accelerator for processing, the core first sends the data to the switchboard which queues the data in memory (which may be located on or off the integrated circuit). Once the accelerator is free to process the data, the switchboard informs the accelerator where the data is located in memory. The accelerator then uses the system bus to retrieve the data from memory and process the data. Instead, in one embodiment, the switchboard assigns a managed address to the accelerator. When the core sends the request to the switchboard, the switchboard can provide the managed address to the core. Using this address, the core can directly send the data to the accelerator using the system bus (once the accelerator indicates to the core it is ready to receive the data). In this manner, the intermediate step of saving the data in memory is not needed, and thus, the data is transmitted on the system bus only once rather than twice.

In one embodiment, the switchboard (also referred to generally as a bus manager) monitors the use of the managed addresses. That is, after providing the managed address to an entity to use when communicating with an accelerator, the switchboard monitors the system bus to identify all the entities that use that managed address. If a source uses the managed address but has not previously been authorized by the switchboard, the switchboard prevents the source from communicating with the accelerator. Thus, if malicious code attempts to instruct an entity to use a managed address the entity has not been authorized to use, the switchboard can detect and prevent the unauthorized entity from doing so.

Figure 1:
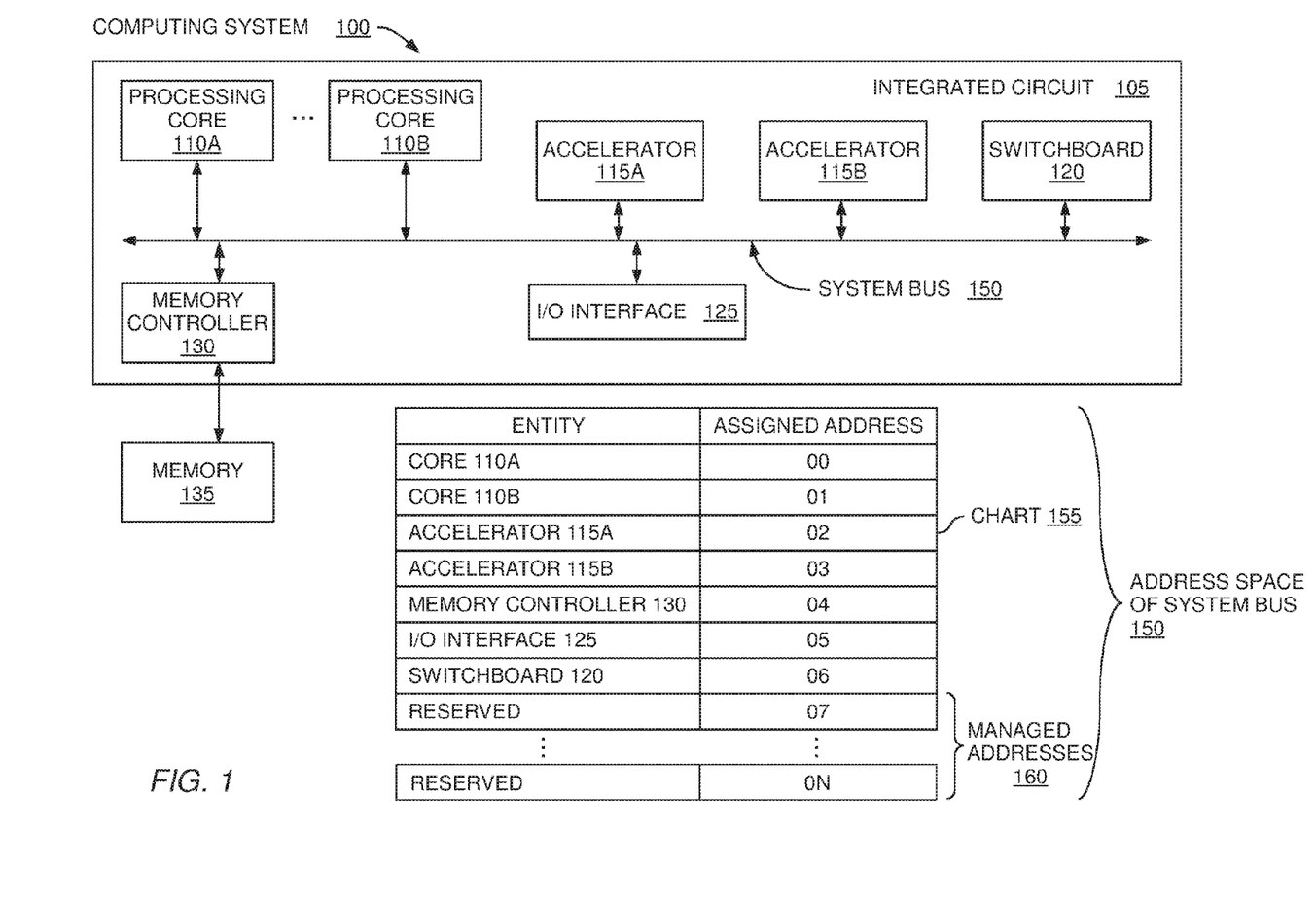
FIG. 1 is a block diagram of an integrated circuit, according to one embodiment described herein.

FIG. 1 is a block diagram of a computing system 100, according to one embodiment described herein. The computing system 100 includes an integrated circuit 105 and memory 135. The memory 135 may include different levels of cache, RAM, or storage (e.g., hard disk drives) in the computing system 100. Although shown as being off chip (i.e., external to the integrated circuit 105), in other embodiments, the integrated circuit 105 may include on board memory for storing data transmitted on a system bus 150 (i.e., a processor bus).

The integrated circuit 105 includes one or more processing cores 110 that process instructions using, for example, a processing pipeline. In one embodiment, the processing cores 110 in the integrated circuit 105 form a general purpose processor. In order to communicate with each other, the processing cores 110 are coupled to the system bus 150 which broadcast data to every element coupled to the bus 150 simultaneously. In addition, the system bus 150 couples the cores to accelerators 115, a switchboard 120, a memory controller 130, and an I/O interface 125. The accelerators 115 represent hardware modules in the integrated circuit 105 that perform a specific purpose. For example, accelerator 115A may perform data compression while accelerator 115B is a crypto-accelerator or XML accelerator. In one example, the cores 110 transmit data to the accelerators 115 to be processed thereby freeing the cores 110 to perform other tasks. For example, a software application may request that the core 110A compress a 1 Gb of data. Instead of performing the compression itself, using a process described later, the core 110A requests that the accelerator 115A perform the compression. Unlike the cores 110 which can provide many different tasks, the accelerators 115 are specialized hardware modules for performing a particular function.

In one embodiment, the accelerators 115 can be reconfigured to perform different functions. For example, although the accelerators 115 are designed to perform one task—e.g., data compression, encoding/decoding, etc. —the integrated circuit 105 can reconfigure the hardware elements in the accelerators 115 to change its task. For example, assume accelerator 115A is currently configured as a data compression accelerator, while accelerator 115B is configures as a crypto-accelerator. The integrated circuit 105 may determine that accelerator 115A is underutilized while accelerator 115B is over-utilized. In response, the integrated circuit 105 may deactivate accelerator 115A and change its function from a data compression accelerator to a crypto-accelerator. Thus, two crypto-accelerators are now available to accept tasks from the cores 110. Of course, if the cores 110 begin transmitting more requests on the system bus 150 for a data compression accelerator, the integrated circuit 105 may change one of the crypto-accelerators into a data compression accelerator.

The memory controller 130 permits the entities coupled to the system bus 150 to access the memory 135. For example, the processing cores 110 and accelerators 115 can use the memory controller 130 to store and retrieve data from the memory 135. Like memory controller 130, the I/O interface 125 also permits the entities coupled to the system bus 150 to access hardware elements external to the integrated circuit 105. For example, the I/O interface 125 may permit the entities in the integrated circuit 105 to communicate with another chip, a PCI link, a system bus disposed on a motherboard, and the like.

The switchboard 120 manages the address space of the system bus 150. As shown in chart 155, each entity coupled to the bus 150 is assigned a unique address. Thus, to transmit data between the entities, a source entity uses the address assigned to the destination entity when transmitting data on the bus 150. For example, if transmitting data to the accelerator 115B, the source entity would use the address 03. Because the data is broadcast to all the entities coupled to the bus 150, the entities constantly monitor the system bus 150 and read data that is addressed to them (and can ignore the rest).

Although chart 155 illustrates that each entity is assigned a single address, in some embodiments, each entity is assigned a range of addresses in the address space. As such, each entity would monitor the system bus 150 to identify data that is addressed to one of the address in their assigned range of address. If the ranges of addresses are mutually exclusive, each address in that range uniquely identifies one of the entities in the integrated circuit 105. In one embodiment, each of the entities includes a base address register (BAR) which includes the address, or range of addresses, assigned to that entity. The switchboard 120 can update the addresses stored in the BAR in order to rearrange the memory assignments shown in chart 155. That is, the switchboard can change the data in the BARs for core 110A and 110B such that core 110A is now assigned address "01" while core 110B is assigned address "00". In this manner, the entities can query their respective BARs to determine the address assigned to them, and thus, identify when data transmitted on the system bus 150 is intended for them.

In addition to using the address space to assign unique addresses to the entities, the address space of the system bus 150 also include managed addresses 160 which are reserved. That is, the switchboard can assign the managed addresses 160 to one of the entities in order to increase the address space (or bandwidth) assigned to the entity. In one embodiment, each of the managed addresses 160 shown in chart 155 represents a range of address. Moreover, each of the managed addresses 160 may be referred to as a virtual channel. As described in more detail below, the switchboard 120 assigns a managed address 160 to one of the entities coupled to the bus 150 (e.g., one of the accelerators 115). Thus, when the switchboard 120 later receives a request from another entity (e.g., a core 110 or I/O interface 125) to use the accelerator 115, the switchboard 120 can provide the managed address to the requesting entity. The requesting entity can then use the managed address to directly communicate with the entity assigned the managed address via the system bus 150. In other words, the requesting entity does not need to first save the data in the memory 135 or use the switchboard 120 as an intermediary to transmit the data to the accelerator 115.

Using managed addresses 160 (or virtual channels) to communicate with the accelerators 115 may be preferred over using the addresses that are specifically assigned to the accelerator as shown in chart 155. For example, the managed addresses 160 are designated for specific purposes instead of for specific entities like the assigned addresses in chart 155. AS such, some managed addresses 160 can be assigned more bandwidth than other addresses 160, or some managed addresses 160 can be used for reads while others for writes to ensure forward progress for each stream type. Moreover, using managed addresses 160 permit the switchboard 120 to swap new accelerators 115 in and out without changing the assigned addresses shown in chart 155. Moreover, using managed addresses 160 means multiple accelerators 115 can accept data using the same managed address 160 which could be used for redundancy or for load sharing.

Figure 2:
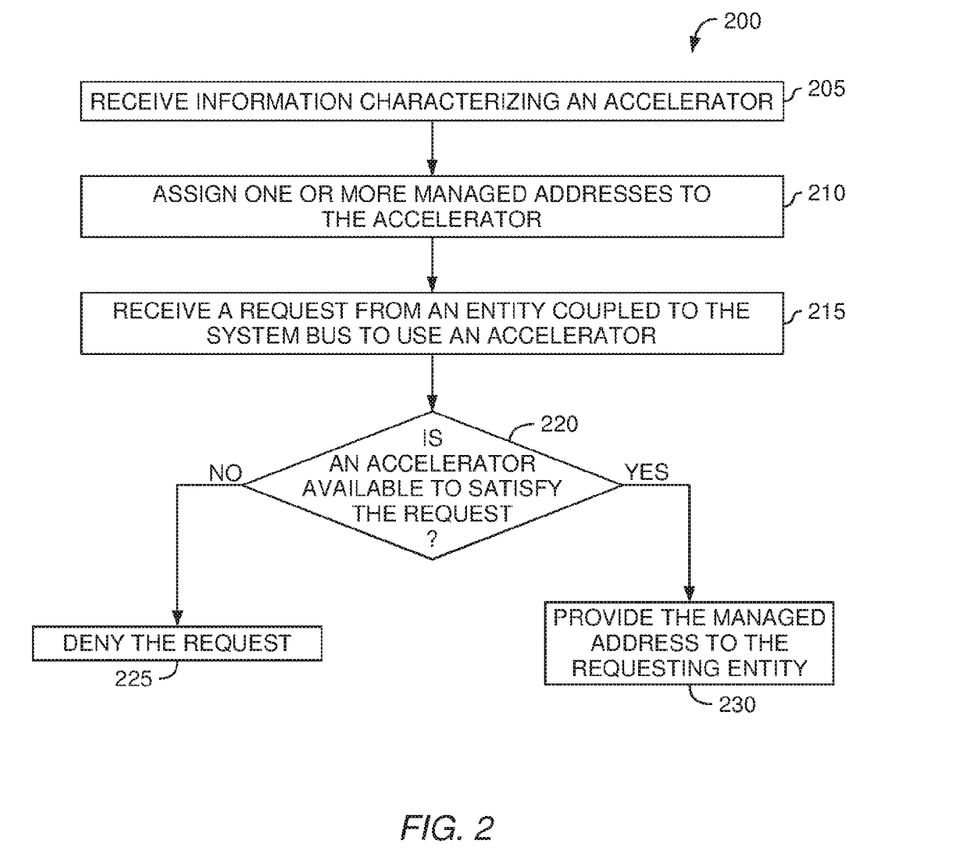
FIG. 2 is a flowchart for assigning managed addresses of a system bus to entities in an integrated circuit, according to one embodiment described herein.

FIG. 2 is a flowchart of a method 200 for assigning managed addresses of a system bus to entities in an integrated circuit, according to one embodiment described herein. Method 200 begins at block 205 where the switchboard receives information characterizing an accelerator coupled to the system bus. In one embodiment, the accelerator transmits a message on the system bus informing the switchboard what type of function the accelerator performs (e.g., data compression, cryptography, XML processing, etc.) which is a characteristic of the accelerator. For example, the hardware elements in the accelerators may be able to perform different specialized functions, and thus, the accelerator informs the switchboard what function the accelerator is currently configured to perform. Moreover, the accelerator may inform the switchboard its bandwidth or the number of jobs the accelerator can handle. With this information, the switchboard can throttle the workload assigned to the accelerator or to prevent too much work from being assigned to the accelerator so that the accelerator does not become a bottleneck.

At block 210, the switchboard assigns one or more of the managed addresses (i.e., the virtual channels) to the accelerator. In one embodiment, the accelerator is assigned the managed address in addition to the address already assigned to the accelerator. Referring to chart 155 in FIG. 1, accelerator 115A is assigned address "03." At block 210 of method 200, the switchboard may also assign the managed address "07" to accelerator 115A. As a result, accelerator 115A monitors the data transmitted on the system bus to determine if the data is addressed to either "03" or "07". If so, the accelerator 115A responds to the data. The managed address "07" provides a special communication channel that can be used to provide direct communication between the accelerator 115A and another entity coupled to the system bus.

Furthermore, if the function of the accelerator changes, the switchboard may assign the managed address to a different accelerator coupled to the system bus. For example, if the integrated circuit reconfigures accelerator 115A to be a crypto-accelerator rather than a data compression engine, the switchboard may no longer assign the managed address to accelerator 115A thereby freeing the managed address to be reassigned to a different entity—e.g., another accelerator.

Returning to method 200, at block 215, the switchboard receives a request from an entity coupled to the system bus to use an accelerator. In one embodiment, the requesting entity does not know the functions of the accelerators, and as such, does not request to use a specific accelerator. For example, in FIG. 1, the processing cores 110, memory controller 130, and I/O interfaces 125 may not know what specialized functions the accelerators 115 are currently configured to perform. Instead, when these entities have data they would like processed by an accelerator, the entities send a request to the switchboard which does know the functions of the accelerators are currently configured to perform. For example, a processing core may transmit a message using the system bus to the address of the switchboard indicating that the core has 1 Gb of data that needs to be compressed. The switchboard functions as a bus manager to evaluate requests provided by the entities coupled to the system bus and determine which accelerator is the best fit for satisfying the request. As such, in one embodiment, the entities do not directly contact the accelerators about fulfilling requests without first receiving permission from the switchboard. Indeed, in one embodiment, the various entities may not know the specific addresses of the other entities coupled to the system bus (since these addresses may change), and thus, always contact the switchboard to determine how to communicate with other entities. For example, an accelerator may be inactive or its function may have changed. Rather than requiring all the entities coupled to the system bus to track the current status and address of the accelerators, the switchboard may be the only entity that knows this information, and thus, the processing core, memory controllers, and I/O interfaces contact the switchboard before sending requests to the accelerators.

At block 220, the switchboard determines whether there is an accelerator available to satisfy the request. In one embodiment, the switchboard determines if there is an accelerator currently configured to perform the function requested by the entity. For example, the entity may request that a chunk of data be decrypted, but if none are the accelerators are crypto-accelerators then the switchboard denies the request at block 225. Moreover, even if there is a crypto-accelerator, the switchboard may determine whether the accelerator has the bandwidth to satisfy the request. For example, the switchboard may track how many entities are currently sending data to the accelerator and the amount of data being sent. If transmitting more data to the accelerator would exceed its capabilities, the switchboard denies the request at block 225. In one embodiment, the switchboard may inform the entity that the accelerator cannot currently satisfy the request but that the entity could try again later.

However, if the switchboard identifies an accelerator that can perform the request and that the accelerator has sufficient bandwidth, at block 230, the switchboard provides the managed address corresponding to that accelerator to the requesting entity. Using the managed address, the requesting entity can directly contact the accelerator via the system bus. Put differently, after providing the managed address to the requesting entity, the switchboard does not participate in the data transfer between the requesting entity and the accelerator. Instead, the requesting entity transmits data onto the system bus using the managed address. The accelerator identifies the data using the managed address, pulls the data from the bus, and processes the data as requested by the entity. Once finished, the accelerator may transmit the processed data back to the requesting entity using the system bus or store the data in memory (i.e., send the processed data to the memory controller using the system bus).

In one embodiment, the switchboard can assign multiple managed addresses (i.e., multiple virtual channels) to the same accelerator. Using method 200, the switchboard can then assign the different managed addresses assigned to the same accelerator to different requesting entities. By having different managed addresses the switchboard can treat the data using these addresses differently. For example, a first one of the managed addresses may be provided to a processing core for transmitting data to the accelerator, while a second one of the managed addresses is provided to the I/O interface. Because the processing core may be more valuable to the performance of the integrated circuit or processor, the second managed address may be throttled such that the processing core (which uses the first managed address) can transmit data faster to the accelerator using the system bus than the I/O interface.

In one embodiment, the switchboard performs dynamic traffic management by monitoring the data transmitted on the system bus. For example, the switchboard may determine that the requesting entity does not efficiently use the managed address provided at block 230. For example, the entity may send only small amounts of data to the accelerator for processing. In the meantime, the switchboard may receive a request from another entity to use the accelerator which may have higher priority than the current entity using the managed address, or the entity may need to send larger amounts of data to the accelerator which would be a more effective use of the accelerator. The switchboard may instruct the current entity using the accelerator that it can no longer use the accelerator and instead assign the managed address to a higher priority entity. Furthermore, assume the accelerator is assigned two managed addresses where one of the managed addresses has more bandwidth than the other. If the switchboard determines that the entity currently using the higher bandwidth managed address is not efficiently using its bandwidth, the switchboard may swap the managed addresses so that the entity previously using the lower bandwidth address now uses the higher bandwidth address to communicate with the accelerator.

As described above, the functions shown in method 200 are performed by a switchboard (e.g., a bus manager) disposed on an integrated circuit such as a processor. Using hardware rather than software to perform the functions described above may increase the overall performance of the computing system by providing much faster responses to data traffic transmitted on the system bus. However, in other embodiments firmware or software may be used to perform one or more of the functions described above.

Figure 3:
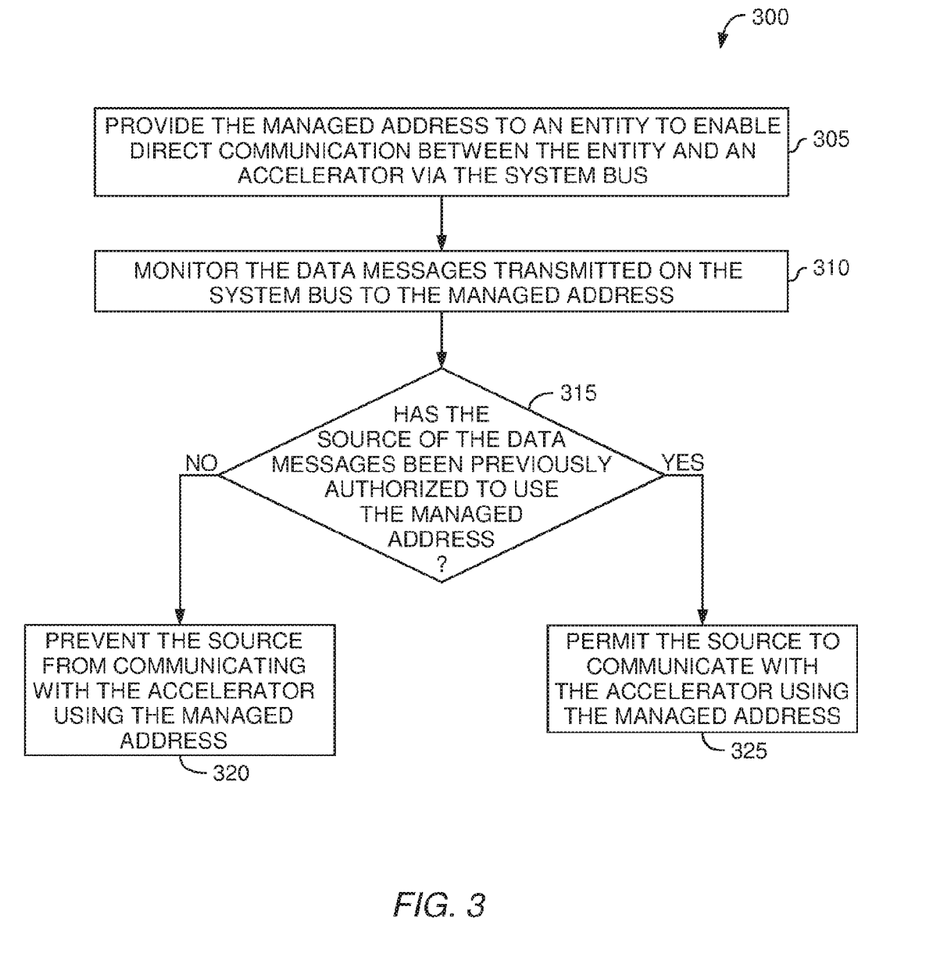
FIG. 3 is a flowchart for monitoring managed addresses in an integrated circuit, according to one embodiment described herein.

FIG. 3 is a flowchart of a method 300 for monitoring managed addresses in an integrated circuit, according to one embodiment described herein. In one embodiment, method 300 is performed by the switchboard to prevent a malicious actor from using the managed addresses without being authorized by the switchboard. At block 305, the switchboard provides the managed address to an entity to enable direct communication between the entity and an accelerator via the system bus. For example, block 305 may be the same as block 230 in method 200 where the switchboard identifies an accelerator that can satisfy a request made by the entity.

At block 310, the switchboard monitors the data messages transmitted on the system bus to the managed address. That is, the switchboard may evaluate each message transmitted on the system bus to determine if the message uses one of managed addresses. If, however, the message uses a different address—e.g., an address assigned to each of the entities using the BAR—the switchboard may ignore the message.

Moreover, although FIG. 3 illustrates that method 300 starts once a managed address has been provided to a requesting entity, the switchboard may monitor the system bus to manage how the managed addresses are being used even if the switchboard has not yet assigned or provided the managed addresses to any of the entities coupled to the system bus. For example, malicious code executing on a processing core may instruct the processing core to use a managed address even if the switchboard has not yet provided that managed address to any entity. Thus, the switchboard may constantly monitor the messages transmitted on the system bus to determine if the messages use one of the managed addresses.

At block 315, the switchboard determines if the source of the data message that includes one of the managed addresses is authorized to use the managed address. For example, the switchboard may maintain a list of all the entities that the switchboard has previously authorized to use each of the managed addresses. Moreover, the switchboard may also track whether an entity that was previously authorized to use the managed address to communicate with the accelerator is now no longer authorized. For example, the switchboard may permit the requesting entity to use the managed address to perform a particular task (e.g., encrypt 1 Gb of data). Once that task is complete, the switchboard may require the requesting entity to again seek its permission before sending more data to the accelerator—i.e., the entity is no longer permitted to use the managed address. Thus, even though the switchboard did provide the managed address to the entity that does not necessarily mean the entity is still authorized to communicate with the accelerator using that managed address.

If the source that transmitted the data message is not authorized to use the managed address, at block 320, the switchboard prevents the source from communicating with the accelerator using the managed address. In one embodiment, before transmitting data to an accelerator, the entity first sends a query message to the accelerator asking the accelerator whether the entity can begin sending data for processing. The entity waits for a response from the accelerator before sending the data. Because the switchboard is also coupled to the system bus, it too receives the query message. Upon determining the entity is not authorized to use the managed message, the switchboard transmits a request denied message to the unauthorized entity using the system bus. Even if the accelerator responds to the query request stating that the accelerator can process the job, the denial message sent by the switchboard supersedes the response by the accelerator and prevents the entity from sending the data. For example, if malicious code executing on an processing core causes the core to use the managed address to attempt to access the accelerator (without first obtaining authorization from the switchboard), the switchboard can detect this unauthorized access and prevent the malicious software from causing the processing core to perform an unauthorized action.

However, if the source is authorized, at block 325, the switchboard permits the source to communicate with the accelerator using the managed address. Stated differently, the switchboard permits the source and the accelerator to communicate directly using the system bus. In this manner, the switchboard can monitor the use of the managed addresses on the system bus to detect and prevent unauthorized access to the accelerators.

Figure 4:
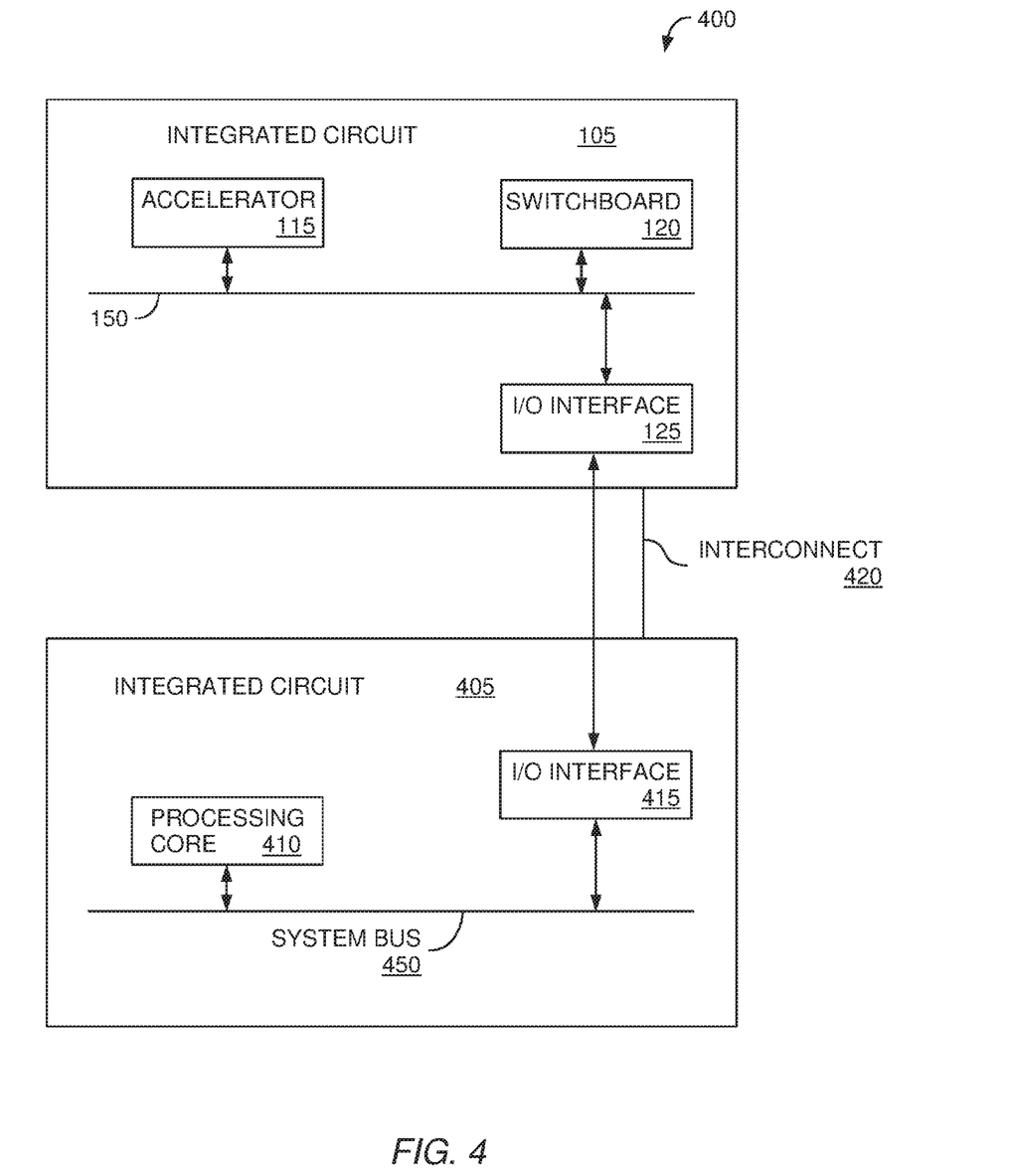
FIG. 4 is a computing system for using managed address when communicating between integrated circuits, according to one embodiment described herein.

FIG. 4 is a processor system 400 for using managed address when communicating between integrated circuits, according to one embodiment described herein. The processor system 400 includes the integrated circuit 105 which is communicatively coupled to integrated circuit 405. As shown, the integrated circuits 105 and 405 are coupled by an interconnect 420 which may be a serial or parallel bus, a PCI link, optical link, and the like. Using the interconnect 420, the I/O interface 125 on the integrated circuit 105 can exchange data with an I/O interface 415 on integrated circuit 405. For example, the integrated circuits 105 and 405 may be two processors disposed in a multi-processor system 400.

In this example, a processing core 410 on the integrated circuit 405 wants to use the accelerator 115 to process data. For example, the integrated circuit 405 may not have any accelerators or its accelerators may be busy handling other tasks. Instead of the processing core 410 performing the function itself, the core 410 may first instruct the I/O interface 415 using system bus 450 to determine if the accelerator 115 on integrated circuit 105 can perform the task. To do so, the I/O interface 415 requests that the I/O interface 125 transmit a request on the system bus 150 to the switchboard 120 to determine if there is an accelerator on the integrated circuit 105 that can perform the task requested by processing core 410. In response, the switchboard 120 may perform blocks 215-230 of method 200 to determine if accelerator 115 is available to perform the task.

Assuming accelerator 115 is available, the switchboard 120 provides the managed address assigned to accelerator 115 to the I/O interface 125. Moreover, the I/O interface 125 informs I/O interface 415 that the accelerator 115 can perform the task requested by the processing core 410. The I/O interface 415 then forwards the data received from the processing core 410 to the I/O interface 125 using the interconnect 420. In turn, the I/O interface 125 uses the managed address to directly communicate with the accelerator 115 via the system bus 150. Once finished processing the data, the accelerator 115 can use the address of the I/O interface 125 to send the processed data to I/O interface 125 which forwards the processed data to the I/O interface 415 and processing core 410 on integrated circuit 405.

In one embodiment, in addition to using a managed address to send data from the I/O interface 125 to the accelerator 115, the switchboard 120 assigns a managed address to the I/O interface 125. Thus, after processing the data, the accelerator 115 can use the managed address assigned to the I/O interface 125 to transmit the processed data directly to the I/O interface 125. That is, when receiving a request from entity (e.g., processing core, I/O interface, memory controller, etc.) to access an accelerator using a managed address, the switchboard may attempt to assign a managed address to the requesting entity (if one is available). If one is assigned, the switchboard informs the accelerator that the requesting entity also has a managed address so that the accelerator can use this address when returning the processed data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements discussed above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. An integrated circuit, comprising:
   a system bus configured to broadcast data to a first and a second hardware entities coupled to the system bus;
   a bus manager coupled to the system bus, wherein the bus manager is configured to:
      assign a managed address to the first entity based on a characteristic of the first entity, wherein the managed address is a reserved address in an address space of the system bus,
      receive a request from the second entity via the system bus to perform a task using the first entity, and
      provide the managed address to the second entity via the system bus, wherein the managed address enables the second entity to communicate directly with the first entity using the system bus,
      wherein the first entity is assigned both a first address and the managed address in the address space of the system bus, wherein the first address is different than the managed address, and wherein the first entity is configured to:
         monitor the system bus to identify data transmitted on the system bus that includes one of the first address and the managed address.

2. The integrated circuit of claim 1, wherein the first entity comprises an accelerator and the bus manager is configured to:
   upon receiving the request, determine whether the accelerator is available to perform the task by comparing a function of the task to a function performed by the accelerator, wherein the managed address is provided to the second entity only if the function of the accelerator is the same as the function of the task.

3. The integrated circuit of claim 2, wherein the bus manager is configured to:
   upon receiving the request, determine whether the accelerator has sufficient bandwidth to perform the task, wherein the managed address is provided to the second entity only if the accelerator has sufficient bandwidth.

4. The integrated circuit of claim 1, further comprising:
   a plurality of processing cores each coupled to the system bus, wherein the second entity is one of the processing cores.

5. The integrated circuit of claim 1, wherein the bus manager is configured to:
   monitor the system bus to identify data transmitted on the system bus that includes the managed address;
   upon identifying data that includes the managed address, identifying a source of the data; and
   upon determining the source is not authorized by the bus manager to use the managed address, prevent the source from communicating with the first entity using the managed address.

6. The integrated circuit of claim 1, wherein the bus manager is configured to:
   receive a message from the first entity using the system bus, the message comprising the characteristic of the first entity.

7. The integrated circuit of claim 1, wherein the bus manager is configured to:
   reassign the managed address from the first entity to a different one of the plurality of hardware entities coupled to the system bus.

8. The integrated circuit of claim 1, wherein the bus manager is configured to manage a plurality of different managed addresses which can be assigned to the plurality of hardware entities coupled to the system bus, wherein the different managed addresses supplement respective addresses that have previously been assigned to the plurality of hardware entities.

9. A processor system, comprising:
   a system bus configured to broadcast data to a plurality of hardware entities communicatively coupled to the system bus;
   an accelerator communicatively coupled to the system bus;
   a plurality of processing cores communicatively coupled to the system bus; and
   a bus manager coupled to the system bus, wherein the bus manager is configured to:
      assign a managed address to the accelerator based on a characteristic of the accelerator, wherein the managed address is a reserved address in an address space of the system bus,
      receive a request from one of the processing cores via the system bus to perform a task using the accelerator, and
      provide the managed address to the one processing core via the system bus, wherein the managed address enables the one processing core to communicate directly with the accelerator using the system bus,
      wherein the accelerator is assigned both a first address and the managed address in the address space of the system bus, wherein the first address is different than the managed address, and wherein the accelerator is configured to:
      monitor the system bus to identify data transmitted on the system bus that includes one of the first address and the managed address.

10. The processor system of claim 9, comprising a plurality of integrated circuits, wherein the accelerator is disposed on a first one of the plurality of integrated circuits and the system bus and the one processing core are disposed on a second one of the plurality of integrated circuits.

11. The processor system of claim 9, wherein the bus manager is configured to:
   upon receiving the request, determine whether the accelerator is available to perform the task by comparing a function of the task to a function performed by the accelerator, wherein the managed address is provided to the one processing core only if the function of the accelerator is the same as the function of the task.

12. The processor system of claim 9, wherein the bus manager is configured to:
   upon receiving the request, determine whether the accelerator has sufficient bandwidth to perform the task, wherein the managed address is provided to the one processing core only if the accelerator has sufficient bandwidth.

13. The processor system of claim 9, wherein the bus manager is configured to:
   monitor the system bus to identify data transmitted on the system bus that includes the managed address;
   upon identifying data that includes the managed address, identifying a source of the data; and
   upon determining the source is not authorized by the bus manager to use the managed address, prevent the source from communicating with the accelerator using the managed address.

14. The processor system of claim 9, wherein the bus manager is configured to manage a plurality of different managed addresses which can be assigned to different entities coupled to the system bus, wherein the different managed addresses supplement respective addresses that have already been assigned to the different entities.

15. A method, comprising:
   assigning, using a bus manager coupled to a system bus, a managed address to an first hardware entity coupled to the system bus based on a characteristic of the first entity, wherein the managed address is a reserved address in an address space of the system bus;
   receiving a request from a second hardware entity coupled to the system bus to perform a task using the first entity; and
   providing the managed address to the second entity via the system bus, wherein the managed address enables the second entity to communicate directly with the first entity using the system bus, wherein the bus manager, system bus, first entity, and second entity are embodied within a common integrated circuit,
   wherein the first hardware entity is assigned both a first address and the managed address in the address space of the system bus, wherein the first address is different than the managed address, and wherein the first hardware entity is configured to:
   monitor the system bus to identify data transmitted on the system bus that includes one of the first address and the managed address.

16. The method of claim 15, wherein the first entity comprises an accelerator, the method further comprising:
   upon receiving the request, determining whether the accelerator is available to perform the task by comparing a function of the task to a function performed by the accelerator, wherein the managed address is provided to the second entity only if the function of the accelerator is the same as the function of the task.

17. The method of claim 15, further comprising:
   upon receiving the request, determining whether the first entity has sufficient bandwidth to perform the task, wherein the managed address is provided to the second entity only if the first entity has sufficient bandwidth.

18. The method of claim 15, further comprising:
   monitoring the system bus to identify data transmitted on the system bus using the managed address;
   upon identifying data transmitted using the managed address, identifying a source of the data; and
   upon determining the source is not authorized to use the managed address, preventing the source from communicating with the first entity using the managed address.

* * * * *